(12) United States Patent
Gaulupeau

(10) Patent No.: US 10,692,614 B2
(45) Date of Patent: Jun. 23, 2020

(54) SEALING DEVICE BETWEEN A TUBE AND A COLUMN PASSING THROUGH THE LATTER, METHOD FOR MOUNTING SAME

(71) Applicant: Electricite de France, Paris (FR)

(72) Inventor: Frédéric Gaulupeau, Ambutrix (FR)

(73) Assignee: Electricite de France (FR)

( * ) Notice: Subject to any disclaimer, the term of this patent is extended or adjusted under 35 U.S.C. 154(b) by 105 days.

(21) Appl. No.: 15/774,486

(22) PCT Filed: Nov. 17, 2016

(86) PCT No.: PCT/EP2016/078070
§ 371 (c)(1),
(2) Date: May 8, 2018

(87) PCT Pub. No.: WO2017/085221
PCT Pub. Date: May 26, 2017

(65) Prior Publication Data
US 2019/0341159 A1   Nov. 7, 2019

(30) Foreign Application Priority Data

Nov. 20, 2015 (FR) ...................... 15 61211

(51) Int. Cl.
*F16L 37/086* (2006.01)
*G21C 19/02* (2006.01)
(Continued)

(52) U.S. Cl.
CPC ............ *G21C 19/02* (2013.01); *F16L 37/086* (2013.01); *F16L 37/101* (2013.01); *G01K 1/08* (2013.01); *G01K 7/02* (2013.01); *G21C 17/112* (2013.01)

(58) Field of Classification Search
CPC ..... G21C 19/02; G21C 17/112; F16L 37/086; F16L 37/101; G01K 1/08; G01K 7/02
See application file for complete search history.

(56) References Cited

U.S. PATENT DOCUMENTS

| 592,899 A | 11/1897 | Wilson |
|---|---|---|
| 2,361,827 A | 10/1944 | Dowell |
| (Continued) | | |

FOREIGN PATENT DOCUMENTS

| BE | 1008091 A6 | 1/1996 |
|---|---|---|
| EP | 0645574 A1 | 3/1995 |
| (Continued) | | |

OTHER PUBLICATIONS

International Search Report for Application No. PCT/EP2016/078070 dated Jan. 25, 2017, 4 pages.

*Primary Examiner* — Gilbert Y Lee
(74) *Attorney, Agent, or Firm* — Lerner, David, Littenberg, Krumholz & Mentlik, LLP

(57) ABSTRACT

The invention relates to a sealing device (30) intended to be fixed against an edge of a tube and against a column. According to the invention, the body (3060) thereof comprises guides (3030), distributed around its cavity (316) between an inner side (3064) that opens into the cavity (316) and an outer side (3062) that opens out against a concentric clamping ring (305), mounted so as to rotate about the axis (A), fingers (303) integral with outer actuating members (3031) being guided in the guides (3030), the ring (305) having actuating zones (3051) that are able to be positioned against the members (3031) so as make the fingers (303) protrude into the cavity (316) by sliding in order to clamp the fingers (303) against the edge of the tube when the ring (305) and the base (306) are in a first position of relative rotation, the ring (305) and the base (306) being able to pass, by rotation about the axis (A), between the first position and a second position in which the zones (3051) are spaced apart from the members (3031) so as to allow the fingers (303) to be returned into the body (3060).

14 Claims, 9 Drawing Sheets

Figure 1:
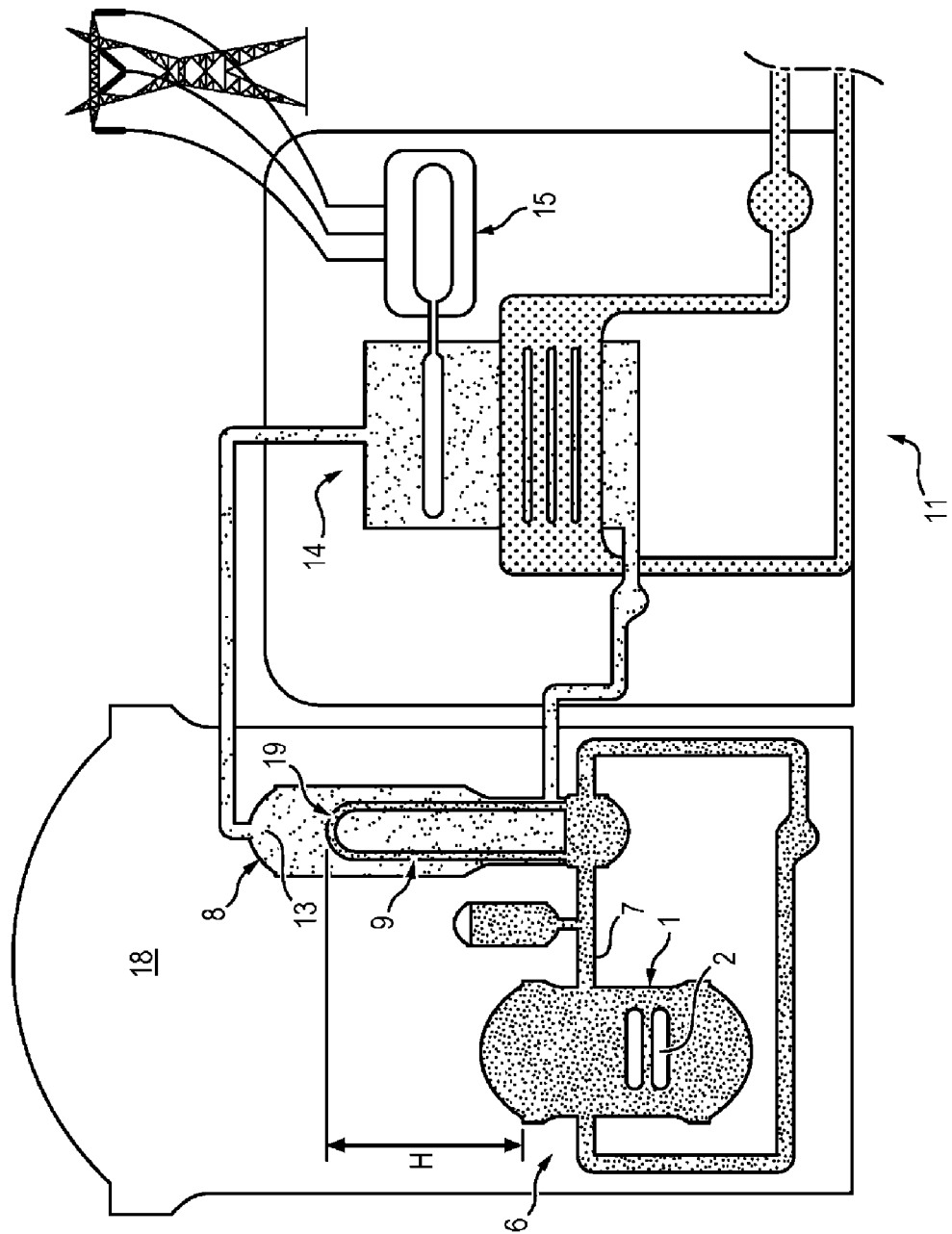

(51) Int. Cl.
*F16L 37/10* (2006.01)
*G01K 1/08* (2006.01)
*G01K 7/02* (2006.01)
G21C 17/112 (2006.01)

(56) References Cited

U.S. PATENT DOCUMENTS

| | | |
|---|---|---|
| 4,807,262 A | 2/1989 | Shields |
| 5,406,596 A | 4/1995 | Malmasson |
| 5,513,228 A | 4/1996 | Malmasson |
| 5,828,711 A | 10/1998 | Malmasson |
| 2004/0150224 A1 | 8/2004 | Lee |
| 2010/0310032 A1 | 12/2010 | Demerle et al. |

FOREIGN PATENT DOCUMENTS

| | | |
|---|---|---|
| FR | 2701154 A1 | 8/1994 |
| FR | 2832216 A1 | 5/2003 |
| FR | 2921510 A1 | 3/2009 |
| FR | 2986299 A1 | 8/2013 |
| JP | H1048383 A | 2/1998 |
| JP | H1062583 A | 3/1998 |
| JP | H1062584 A | 3/1998 |
| WO | 2005062312 A2 | 7/2005 |

SEALING DEVICE BETWEEN A TUBE AND A COLUMN PASSING THROUGH THE LATTER, METHOD FOR MOUNTING SAME

CROSS REFERENCE TO RELATED APPLICATIONS

The present application is a national phase entry under 35 U.S.C. § 371 of International Application No. PCT/EP2016/078070, filed Nov. 17, 2016, which claims priority from French Patent Application No. 1561211 filed Nov. 20, 2015, all of which are hereby incorporated herein by reference.

The invention relates to a sealing device intended to be fixed against an end edge of a tube and against a column needing to pass through the tube, as well as a method for mounting this device.

One field of the invention relates in particular to thermocouple columns disposed on a tube of a cover of a pressurized-water reactor vessel, such as for example a nuclear reactor of a nuclear power plant, these thermocouples needing to measure, through the column entering inside of the vessel, the temperature within it.

Document JPA-10062583 describes a sealing device including a base having three cams for clamping a vertical thermocouple column, including two fixed cams and a cam that is movable by turning a horizontal outer bolt screwed into the base. One disadvantage of this known device is that it carries out clamping of the movable cam against the fixed cams, leading to asymmetries in clamping and therefore in the force applied to the seals, with a risk of jamming Another disadvantage of this device is that the user must take care to avoid having the cams be tilted around the column. Another disadvantage of this device is that the user requires a great deal of time to tighten the bolt so as to clamp the column, which is penalizing in environments with strong constraints on personnel, such as for example a nuclear power plant, inside which personnel can be subjected to ionizing radiation.

Document JP-A-10062584 describes a sealing device including a base having three cams for clamping a vertical thermocouple column, including one fixed cam and two cams movable by the rotation of two handles fixed to them around two vertical axes fixed to the base. One disadvantage of this known device is that it carries out clamping of the movable cams against a fixed cam, leading to asymmetries in clamping and therefore in the force applied to the seals, with a risk of jamming Another disadvantage of this device is that the user must take care to avoid having the cams be tilted around the column. Another disadvantage of this device is that the user must exert considerable force several times to have each of the handles turn, which is penalizing in environments with strong constraints on personnel, such as for example a nuclear power plant, inside which personnel can be subjected to ionizing radiation.

Document JP-A-10048383 describes a sealing device including a base having cams for clamping a vertical thermocouple column, these cams being movable by rotation of two handles fixed to them around two horizontal axes fixed to the base. This device has disadvantages similar to those indicated above for the device known from document JPA-10062584.

The invention aims to obtain a sealing device and a method for its mounting which palliate the disadvantages of the prior art.

To this end, a first subject matter of the invention is a sealing device intended to be fixed against an end edge of a tube and against a column which must pass along an axis of the column through an opening in the tube, delimited by this edge, the device including a base having a feedthrough for the axial passage of the column, a first sealing member capable of being activated to be pressed against the column in the feedthrough, a body surrounding around the axis a cavity for receiving the edge of the tube and a second sealing member intended to be pressed against the edge of the tube in the cavity, the feedthrough communicating axially with the cavity, characterized in that the body includes a plurality of guides, which are distributed around the cavity and which extend between an inner side which opens into the cavity and an outer side which opens against a concentric clamping ring, rotatably mounted around the axis with respect to the base, a plurality of inner fingers integral with a plurality of outer actuating members being guided respectively in the plurality of guides around the cavity, the ring including a plurality of actuation zones which are mutually distant and which are capable of being positioned against respectively the plurality of outer actuating members to cause the inner fingers to slide and to protrude in the cavity for clamping the fingers against the edge of the tube when the ring and the base are, with respect to one another, in a first relative rotational position, called first tube edge clamping position, the ring and the base being capable of passing, by rotation with respect to one another around the axis, between one and the other of the first relative rotational position and a second relative rotational position, called tube edge unclamping position, in which the plurality of actuation zones is at a distance from the plurality of outer actuating members to allow the fingers to be retracted into the body.

Thanks to the invention, clamping reliability and the intervention time of personnel to implement the fixing of the device are improved, which is particularly advantageous in environments with strong constraints on personnel, such as for example a nuclear power plant, inside which personnel can be subjected to ionizing radiation. The invention thus allows, with a single manipulation of rotation from the second to the first position, to uniformly and almost simultaneously clamp all the fingers against the tube, thus avoiding any jamming or incorrect positioning.

According to one embodiment of the invention, the plurality of guides extends radially with respect to the axis for the radial guidance of the fingers with respect to the axis.

According to one embodiment of the invention, the base and/or the body is integral with at least a first handle, and the ring is integral with at least a second handle.

According to one embodiment of the invention, the base includes a lock for blocking the ring and the body in their first relative rotational position, the lock being connected to a manual actuation means allowing the lock to be unlocked to allow passage from the first relative rotational position to the second relative rotational position.

According to one embodiment of the invention, the plurality of actuation zones comprises respectively a plurality of portions of the inner surface of the ring, separated from one another around the axis by a plurality of recesses of this inner surface, which are farther from the axis than its portions and which are used for the reception, respectively, of the plurality of outer actuating members in the second relative rotational position.

According to one embodiment of the invention, each recess has a first slope, starting from the portion of the inner surface of the ring and extending away from the axis until a bottom of the recess, for guiding the outer actuating member between one and the other of a first position retracted into the guide in the first relative rotational position and a second position protruding in the bottom in the second relative rotational position.

According to one embodiment of the invention, each outer actuating member comprises a cam having a second slope turned toward the ring and rising in the same direction as the first slope.

According to one embodiment of the invention, each guide includes a biasing element for biasing the outer actuating member to move toward the ring.

According to one embodiment of the invention, the first sealing member includes a first dynamic seal, adjoining the feedthrough and capable of being activated by inflation by injection of a fluid via an endpiece of the base to press a portion of the first seal against the column in the feedthrough.

According to one embodiment of the invention, the sealing includes movement transmission means for pressing the second sealing member against the edge of the tube, when the ring and the base pass from the second relative rotational position to the first relative rotational position.

According to one embodiment of the invention, the second sealing member includes a second seal turned in a first direction of the axis toward a first surface of the edge of the tube, the movement transmission means include on each finger a second support surface for bearing against a second surface of the edge, which is axially distant from the first surface, this second support surface rising in a second direction, which is reverse of the first direction and runs from the inside to the outside, to press the second seal toward the first surface, when the finger slides in the cavity from the outside to the inside until the first tube edge clamping position.

According to one embodiment of the invention, at least three fingers are provided, of which at least two are positioned in a first 180° angular sector around the axis and of which at least one other is positioned in a second 180° angular sector complementary to the first sector in the first tube edge clamping position.

According to one embodiment of the invention, the sealing device includes removable fixing means of at least one plug to plug the feedthrough in the absence of a column in the latter.

A second subject matter of the invention is a method for mounting the sealing device as described above against an end edge of a tube and against a column which must pass through an opening in the tube, delimited by this edge, along an axis of the column, the sealing device including movement transmission means for pressing the second sealing member against the edge of the tube, when the ring and the base pass from the second relative rotational position to the first relative rotational position for clamping against the edge of the tube, a method in which the ring and the base are rotated with respect to one another around the axis from the second relative rotational position to the first relative rotational position, for clamping the base against the edge (281) of the tube and for pressing the second sealing member against the edge of the tube, then the first sealing member is activated to press it against the column in the feedthrough.

Figure 2:
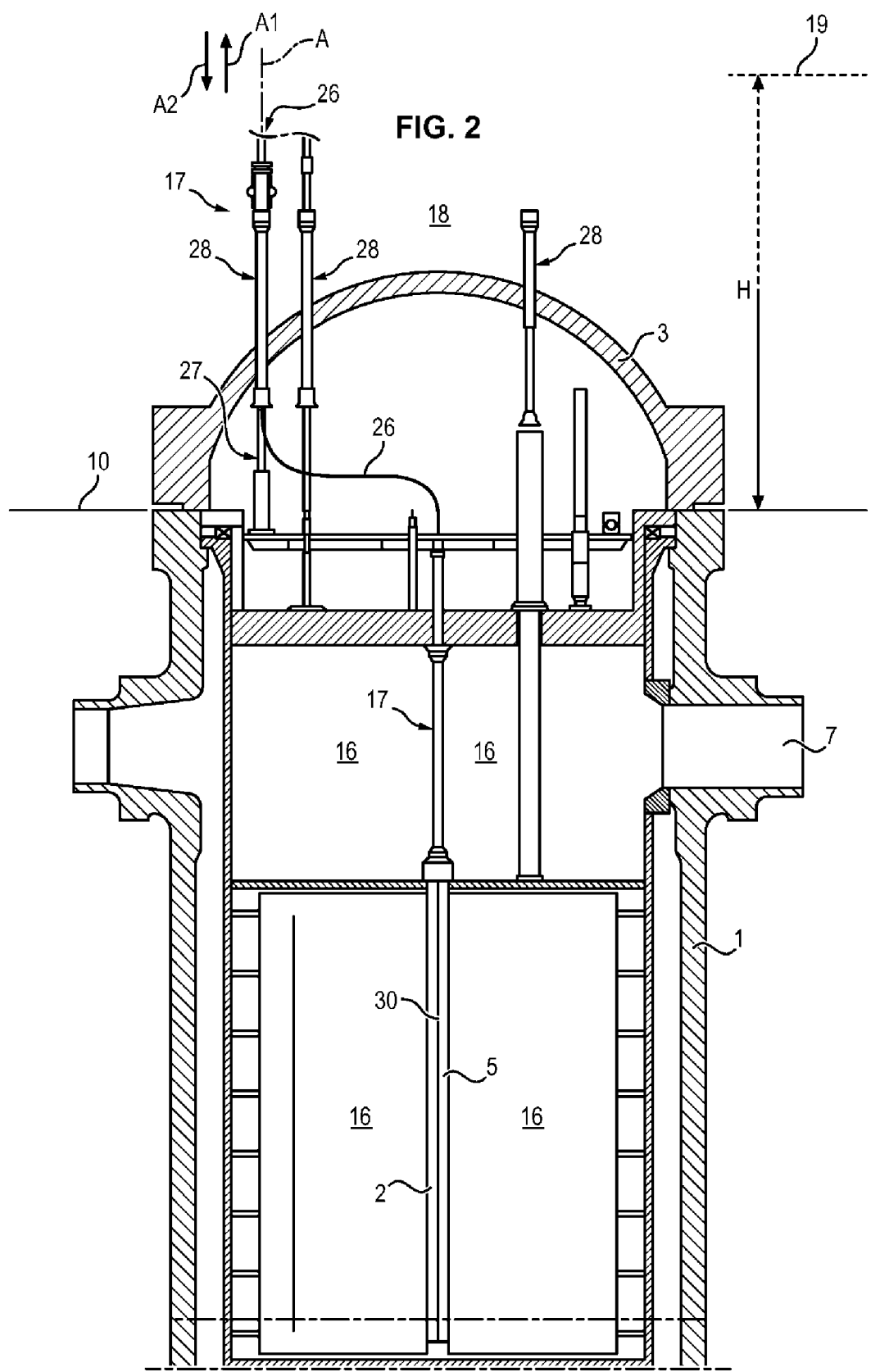
Figure 3:
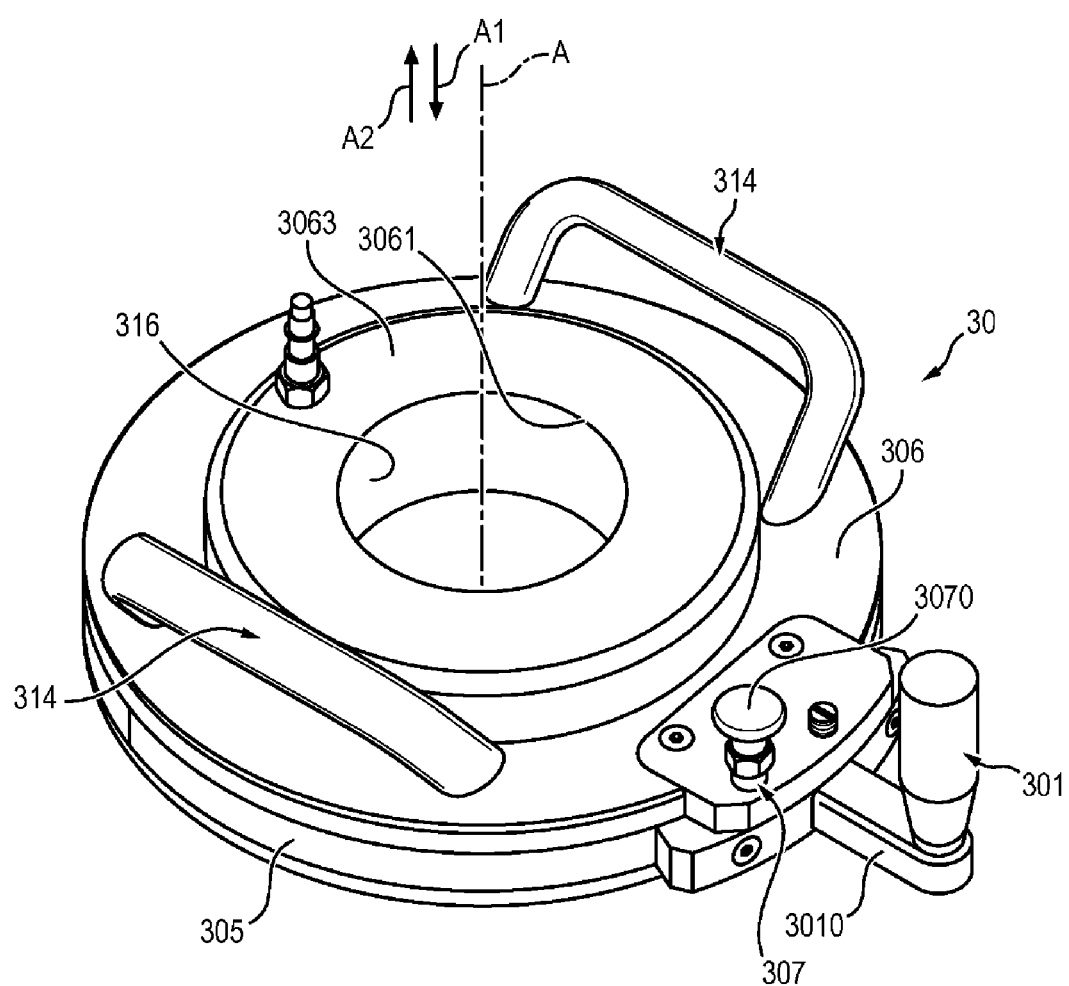
Figure 4:
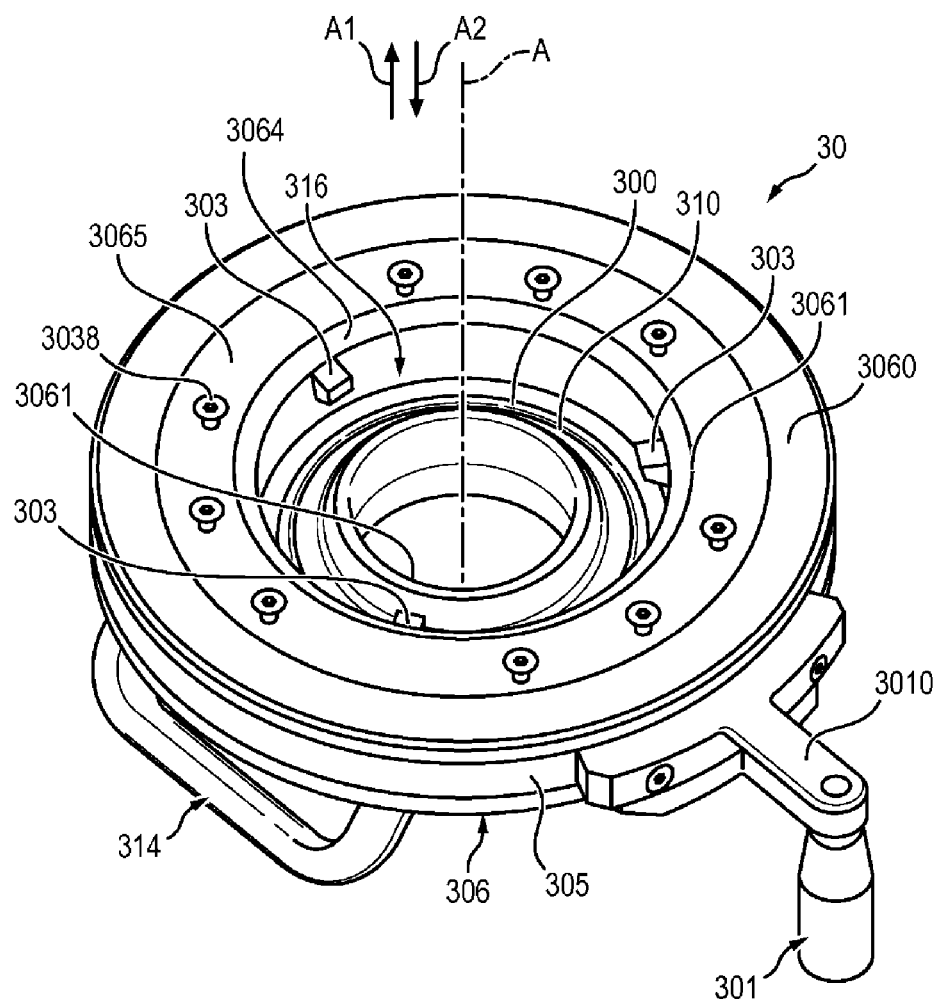
Figure 5:
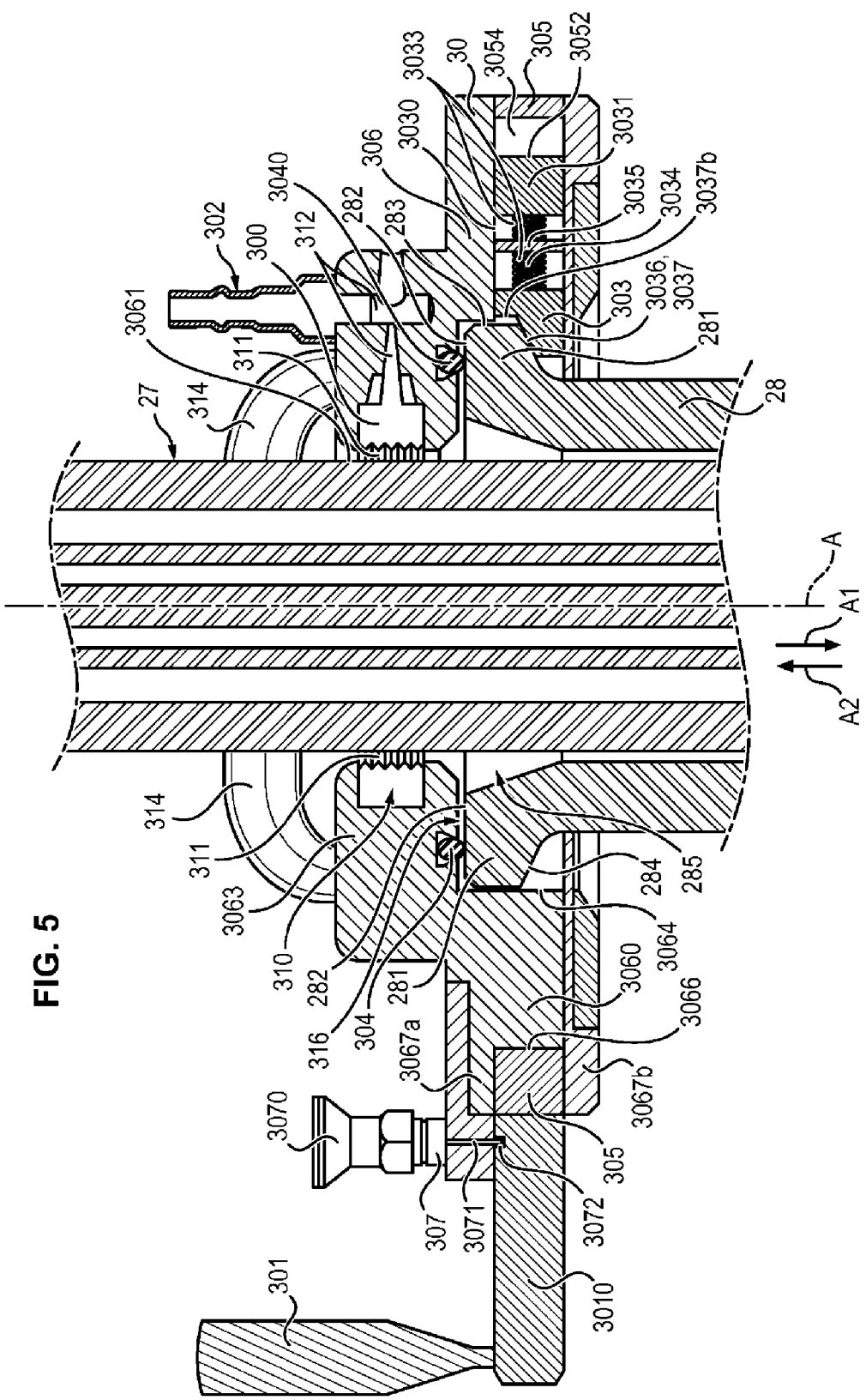
Figure 6:
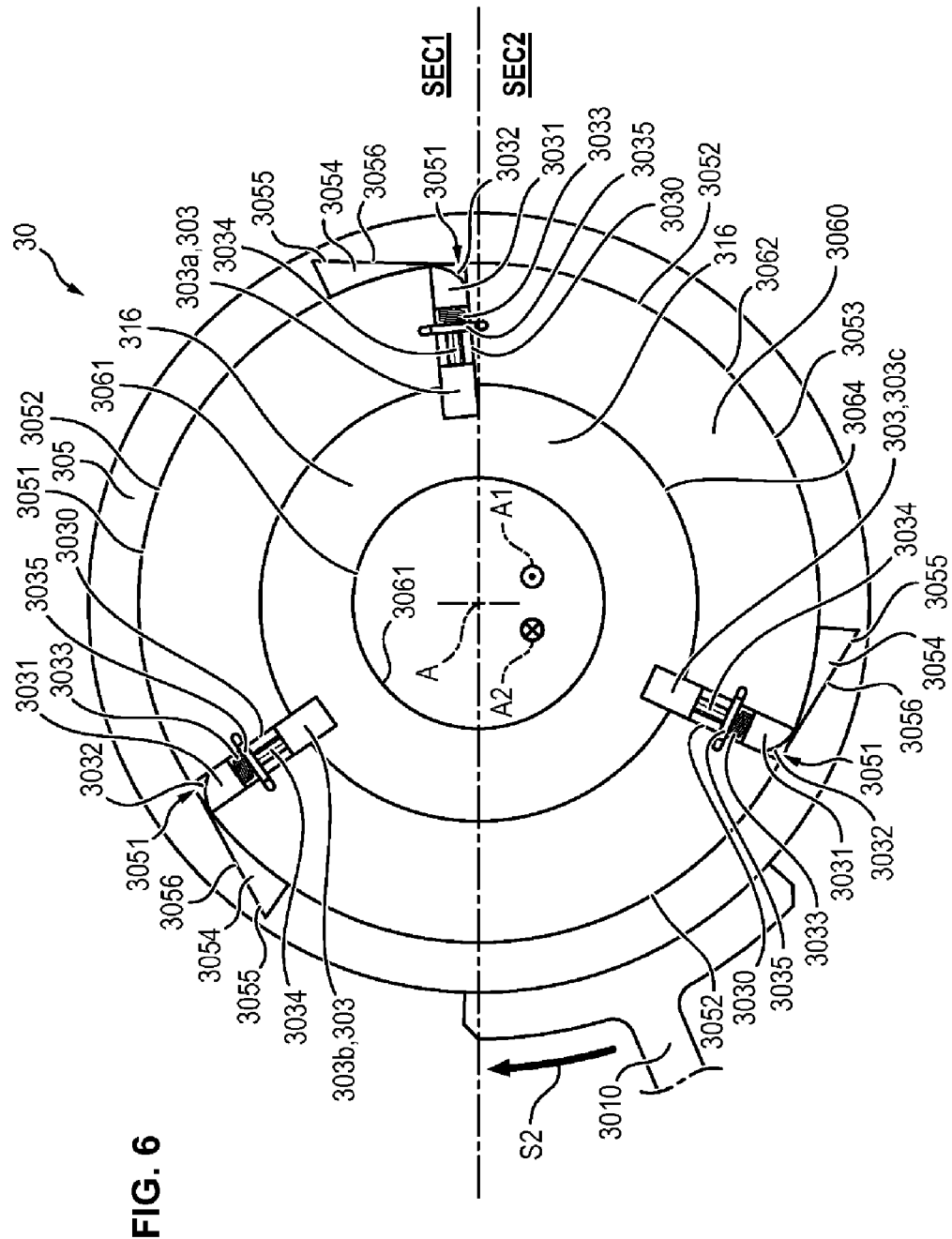
Figure 7:
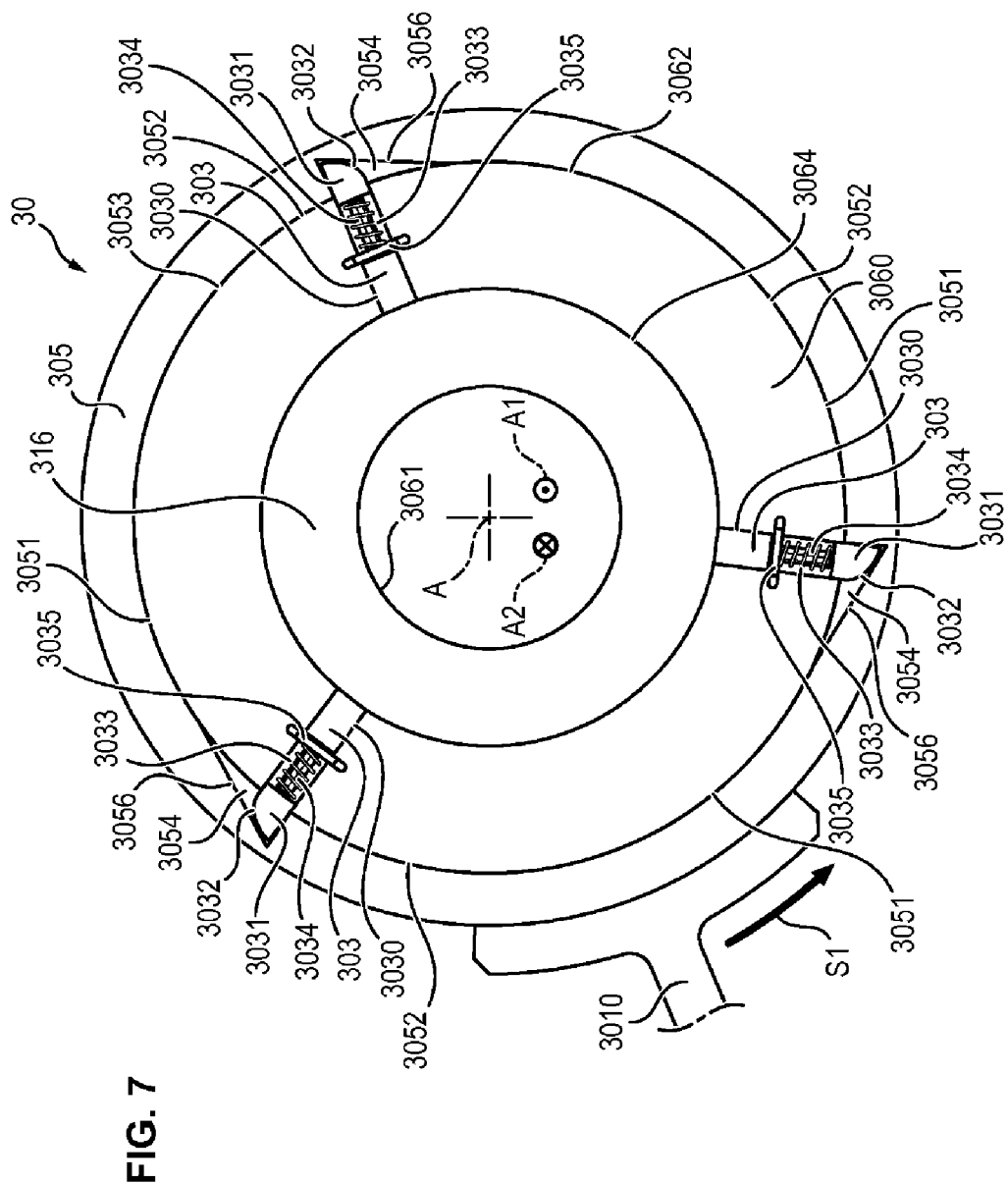
Figure 8:
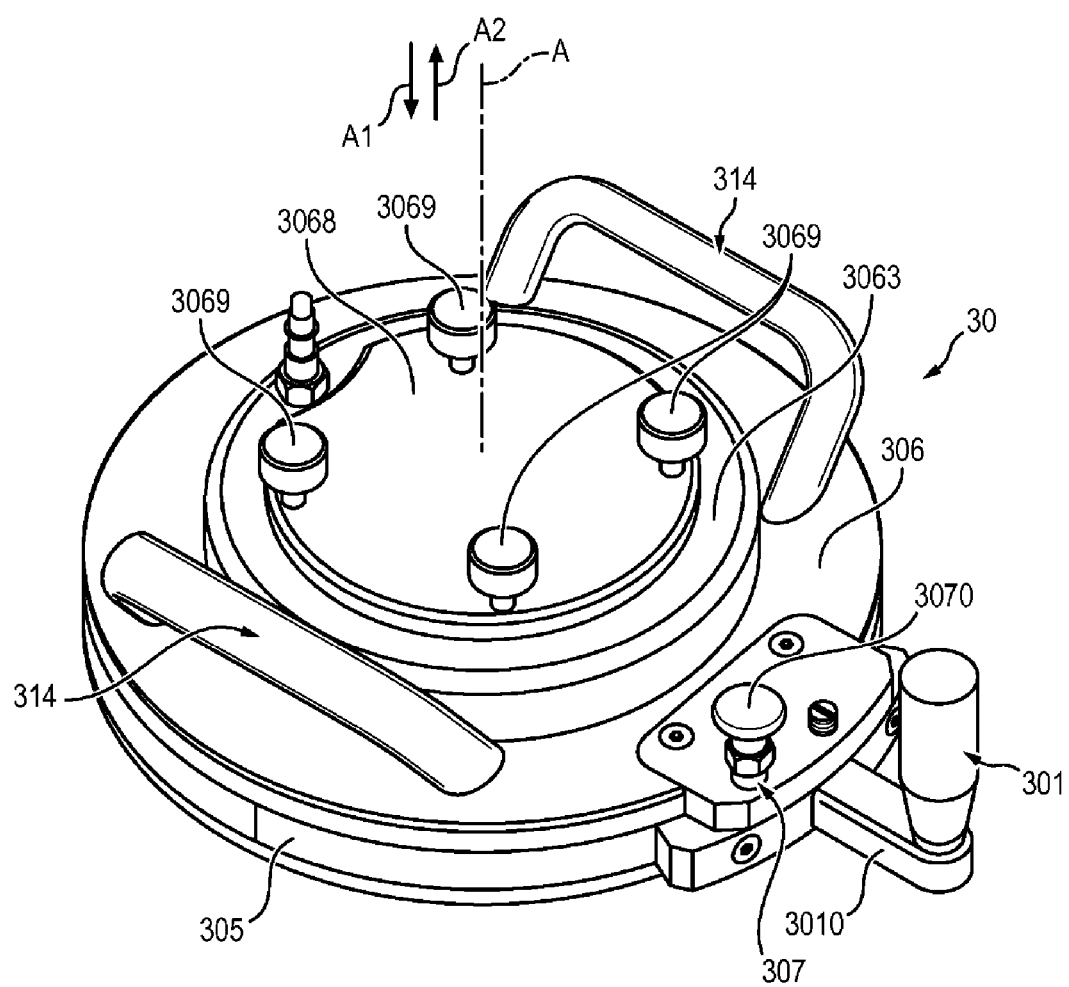
Figure 9:
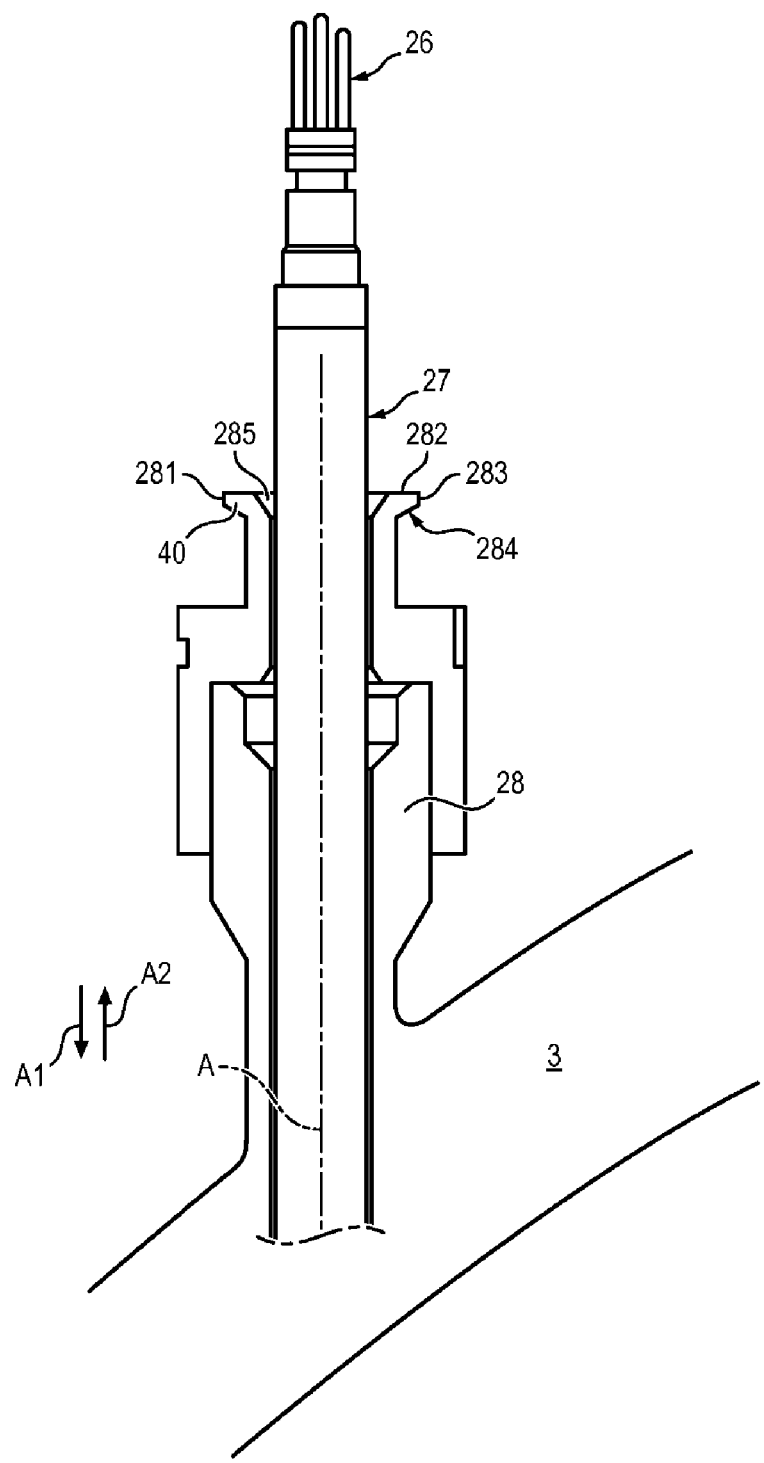

The invention will be better understood upon reading the description that follows, given only by way of a nonlimiting example and with reference to the appended drawings, in which:

FIG. 1 shows schematically a nuclear power plant, in which the sealing device and its mounting method according to the invention can be implemented, FIG. 2 is a schematic transversal section view of a vessel of a reactor of a nuclear power plant according to FIG. 1, on which the sealing device according to the invention can be implemented, FIG. 3 is a schematic perspective view from above of the sealing device according to one embodiment of the invention, FIG. 4 is a schematic perspective view from below of the sealing device according to one embodiment of the invention, FIG. 5 is a schematic axial section view of the sealing device according to one embodiment of the invention, FIG. 6 is a schematic view from below of the sealing device according to the invention in a first clamping position of the tube, FIG. 7 is a schematic view from below of the sealing device according to one embodiment of the invention in a second unclamping position of the tube, FIG. 8 is a schematic view in perspective from above of the sealing device according to one embodiment of the invention, in which its opening is plugged by a plate, FIG. 9 shows schematically in a vertical section an example of a flange to which can be fixed the sealing device according to the invention, First described below with reference to FIGS. 1 and 2, is a context to which the sealing device according to the invention and the mounting method according to the invention can be applied. Of course, the invention can be applied to different contexts.

FIG. 1 shows a nuclear power plant. Thermal energy is produced by its nuclear reactor (6) formed by fissile fuel (2) cooled by water (16), all placed in the vessel (1). FIG. 2 shows a fissile fuel element (5). The hot water (7) produced passes through a steam generator (8) through hundreds of inverted-U-shaped loops (9) with a very great height (H) with respect to the reactor, in particular with respect to the seal plane (10) of the vessel (1) on which the cover (3) rests. The heat of the loops will bring the water of a secondary circuit (11) to the vapor state (13), which will actuate turbines (14), themselves driving generators (15) producing electricity.

The tube (28) is welded to the cover (3). Inside the tube (28) passes a thermocouple column (27) passing through the cover (3) inside of the tube (28).

In use, it is important to control the power of the reactor (6) by monitoring in particular the temperature of the fuel assemblies (5) of the core (2) and more precisely the temperature of the water (16) that cools it. To this end, an internal instrumentation (17), called the upper instrumentation, above the core as shown in FIG. 2, allows power control and temperature measurement by thermocouples (26) movable in the top of the core. These thermocouples (26) are guided in the columns (27) which pass through the cover (3) and which are retained by tubes (28) which pass through the cover (3), which are welded to the latter while emerging in the outer portion of the latter, i.e. in the enclosure (18) of the reactor building.

The water of the reactor being under 155 bars pressure, it is indispensable that sealing between the columns (27) and the tubes (28) be ensured during operation, certain sealing systems, hereafter called dedicated sealing systems and not shown, being previously mounted to this end on the columns (27) and the tubes (28) for sealing between them during the operation of the reactor. When the reactor is shut down, the cover (3) is removed, which mechanically imposes the removal of these dedicated sealing systems between the columns (27) and tubes (28).

Yet, a particular maintenance operation called Vacuumization of the primary circuit for filling it with water necessitates the temporary replacement of the cover (3) on the vessel (1). As in this case, the thermocouple column (27) has been stripped of its dedicated sealing systems, the sealing function must again be provided for. Sealing must again be provided for between the column (27) and the tube (28) or the flange (40). When the reactor is shut down for the Vacuumization, the pressure of the core is at atmospheric pressure compared with the 155 bars during operation and the sealing function is generally provided by another sealing device, and not by the dedicated sealing systems. In fact, the parts of the dedicated sealing systems are sensitive to manipulation and impose additional dosimetry. But this temporary solution is not satisfactory. It leads to operations that are penalizing overall; first as regards duration, hence cost, and consequently unnecessarily increases individual and collective personnel dosimetry, while remaining within the authorized limits for working exposed to radiation.

One of the problems resolved by the present invention is to improve this situation during the Vacuumization test of the primary circuit of a nuclear power plant, carrying out the cover (3) of the vessel. The sealing device according to the invention allows the sealing function of the thermocouple columns to be provided during Vacuumization (MSV) tests of the primary circuit, with core unloaded, of a nuclear power plant. The solution is applicable when the use of the real cover (that is the cover (3) used during the operation of the reactor) for vacuumization is unavoidable for different reasons, for example the unavailability of a dummy cover in another embodiment of the vacuumization. The invention improves and makes reliable the sealing accomplished around the thermocouple columns (27) and simplifies the insertion mode by eliminating human interventions in the bottom of the pool, near the cover of the vessel, and costly in integrated collective dosimetry.

The principles of the procedure for vacuumization (called MSV below) are recalled below, and the sealing function of the thermocouple columns (27), during operation and in the test situation of filling the primary circuit during Vacuumization according to the prior art.

Once the reactor is shut down, the cover (3) is removed from the vessel (1) and set aside. The fuel (5) is unloaded.

Before loading the new core, it is necessary to fill the primary circuit and to leave no air volume inside it. During the filling of a reactor loop, at atmospheric pressure, the hydrostatic equilibrium of the water levels does not allow the height of the vessel seal plane (10) to be exceeded, due to the height (H) which separates the vessel seal plane (10) and the top (19) of the loops (9).

To complete the filling and to fill with water the upper portion of the loops, and therefore to drive out the air which is trapped there, a Vacuumization (MSV) operation is carried out.

Document FR-A-2 921 510 describes in detail this method implemented on a dummy cover. This method is applicable to the "real cover" (3).

The Vacuumization (MSV) method includes the following steps.

After the shutdown of the reactor and resetting the primary circuit pressure to Atmospheric Pressure, The cover (3) is removed, the dedicated sealing system of the devices (27, 28) is replaced, according to the prior art practice, with caps for protection of the female flanges (40).

The core is unloaded, the primary circuit is purged for maintenance of the stop of the nuclear plant unit.

When maintenance is finished, the primary circuit must be filled.

The cover (3) is placed, by depositing it on a silicone seal on the vessel seal plane (10) which seals the primary circuit at atmospheric pressure, a provisional sealing system is installed around the thermocouple columns (27) and a vacuum is created in the primary circuit, to approximately 300 mb; this depressurization increases the sealing effect at the silicone seal.

The primary circuit is filled to the highest possible level in the loops, leaving air pockets present, however (filling step).

Vents are then opened to break the vacuum, which causes the water to circulate toward the top of the loops; the water level in the vessel drops. The pressure returns to Atmospheric pressure.

The water is partially purged up to the vessel seal plane (10), the provisional sealing system is withdrawn, then the protection caps are placed again. The vessel seal plane is in the vicinity of the bottom level of the pool.

The cover (3) is withdrawn, the filling of the vessel continues.

The core is loaded.

The cover (3) is placed again and bolted to the vessel.

The protection caps are removed, then the normal seals used for operation are placed again.

These steps in the MSV impose the sealing of the thermocouple columns. As shown by FIG. 2, the water filling step leads to filling the totality of the vessel (1) and its cover (3) with water; said water being able to infiltrate the feedthroughs of the cover from which the tubes (28) welded to the cover (3) emerge. During the installation or the removal of the cover (3), the column slides to some extent inside the tube (28), this after having withdrawn all the other devices ensuring sealing disposed in the upper portion.

Described below with reference to FIGS. 3 to 8 is the sealing device according to the invention.

The sealing device 30 according to the invention is intended to be attached against an end edge 281 of a tube 28 and against a column 27. The column 27 must pass through, along an axis A of the column 27, an opening 285 of the tube 28, this opening 285 being delimited by this edge 281. The column 27 has for example an outer cylindrical surface, possibly circularly cylindrical around the axis A. The column 27 can be any column allowing measuring instrumentation for measuring one or more parameters to pass, from the end edge 281 of the tube 28 into the space situated at the other end of the tube 28 (inside of the vessel 1 in the application example mentioned above), such as for example one or more temperatures, for example by one more thermocouples, or other parameters.

The sealing device 30 includes a base 306 having a feedthrough 3061 for the passage of the column 27 along the axis A. The sealing device 30 further includes a first sealing member 310 for providing sealing against the column 27 in the feedthrough 3061. According to one embodiment, the first sealing member 310 is capable of being activated to be pressed against the column 27 in the feedthrough 3061. When the first sealing member 310 is not activated, the column 27 can slide along the axis A in the feedthrough 3061.

The sealing device 30 further includes a body 3060, which surrounds, around the axis A, a cavity 316 used to receive the edge 281 of the tube 28. The sealing device 30 further includes a second sealing member 304 intended to be pressed against the edge 281 of the tube 28 in the cavity 316. The feedthrough 3061 is connected, in a direction running parallel to the axis A, with the cavity 316. The feedthrough 3061 has a transverse dimension (for example a transverse diameter) which is less than the transverse dimension (for example a transverse diameter) of the cavity 316, the transverse direction being taken with respect to the axis A passing through this transverse direction, which is for example perpendicular to the axis A.

According to the invention, the body 3060 includes a ring 305 rotatably mounted around the body 3060, this ring 305 serving to concentrically clamp a plurality of fingers 303 guided in guides 3030 against the edge 281 of the tube 28. The body 3060 includes a plurality of guides 3030, which are distributed around the cavity 316 and which extend between an inner side 3064 of the body 3060, which opens into the cavity 316 and an outer side 3062 which opens against the ring 305. The ring 305 is rotatably mounted around the axis A with respect to the base 306. The ring 305 surrounds the body 3060 and is therefore situated outside this body 3060. The ring 305 has for example an annular shape. The ring 305 is for example rotatably mounted in a peripheral groove 3066 of the body 3060, delimited by an upper wall 3067a and a lower wall 3067b, separated from one another along the axis A. The ring 305 can for example be made in the form of two halfrings around the axis A.

Hereafter, the direction running from the outside to the inside is a direction approaching the axis A or the column 27 or the cavity 316.

A plurality of inner fingers 303 is provided, which are integral respectively with a plurality of outer actuating members 3031. The plurality of outer actuating members 3031 are guided respectively in the plurality of guides 3030 around the cavity 316. The ring 305 comprises a plurality of mutually distant actuation zones 3051 capable of being positioned against, respectively, the plurality of outer actuating members 3031 to cause the fingers 303 to slide and to protrude in the cavity 316 for clamping the fingers 303 against the edge 281 of the tube 28, when the ring 305 and the base 306 are in a first relative rotational position relative to one another, called the first tube 28 edge 281 clamping position, shown in FIG. 6.

The ring 305 and the base 306 are capable of passing, by rotation with respect to one another around the axis A, between one and the other of the first relative rotational position and a second relative rotational position, called the tube 28 edge 281 unclamping position. In this second relative rotational position, shown in FIG. 7, the plurality of actuation zones 3051 is at a distance from the plurality of outer actuating members 3031 to allow the fingers 303 to be retracted into the body 3060. It is in this second unclamping position that the sealing device 30 can be slid around the column 27 and the edge 281 or be removed from them.

Thus, the ring 305 is a concentric ring 305 for clamping the fingers against the edge 281 of the tube 28. The ring 305 thus allows a uniform distribution of the clamping force around the tube 28 to be ensured, by carrying out a single rotation action around the column 27. This invention thus allows saving manipulation and installation time of the sealing device 30, as well as reliability in clamping and reliability in sealing.

The body 3060 can for example have a generally annular shape around the axis A and the cavity 316. The base 306 includes for example an upper portion 3063 delimiting the feedthrough 3061 and connected or fixed or in a single piece with the body 3060. The upper portion 3063 can for example have an annular shape around the axis A and around the feedthrough 3061. The upper portion 3063 can be formed for example by a first overriding plate and fixed to a second plate forming the body 3060, these plates extending transversely and for example perpendicular to the axis A.

In the embodiment shown in the figures, the inner side 3064 of the body 3060 is cylindrical around the axis A, for example circularly cylindrical around the axis A. The outer side 3062 of the body 3060 is for example cylindrical around the axis A, for example circularly cylindrical around the axis A. The ring 305 is for example cylindrical around the axis A, for example circularly cylindrical around the axis A.

The guides 3030 are arranged to ensure guidance of their respective finger 303 from the outside to the inside with respect to the axis A, that is to cause the fingers 303 to approach for example this axis A, and in the reverse direction. In the embodiment shown in FIGS. 6 and 7, the guides 303 are rectilinear. Of course, in other embodiments not shown, the guides 303 could be curved. According to the embodiment shown in FIGS. 6 and 7, the plurality of guides 3030 extends radially with respect to the axis A for the radial guidance of the fingers 303 with respect to the axis A. Of course, the guides 3030 may not extend radially with respect to the axis A and can extend obliquely.

According to the embodiment of FIG. 4, it can be provided under the lower portion of the body 3060, that is under its portion distant from the sealing members 310, 304 along the axis A, a ring 3065 delimiting the guides 3030 and allowing, when the ring 3037 is dismantled, the insertion of the fingers 303, the actuating members 3031 and the parts fixed to them in the guides 3030. The ring 3065 can be fixed to the body 3030 by removable fixing means, for example by bolts 3038 or by nonremovable fixing means, for example by rivets 3038. FIGS. 6 and 7 are shown without showing the lower wall 3067b and the portion 3065, so as to show the elements present in the guides 3030.

According to one embodiment, the base 306 and/or the body 3060 is integral with at least one first handle 314, while the ring 305 is integral with at least one second handle 301. Thus, the handles 301 and 314 allow the user to cause the ring 305 and the base 306 to turn with respect to one another around the axis A to cause the fingers 303 to pass from one to the other of the first clamping position to the second unclamping position. For example, the handle 301 is fixed to the ring 305 through an outer arm 3010.

According to one embodiment, the base 306 includes a lock 307 for blocking the ring 305 and the body 3060 in their first relative rotational position. The lock 307 is connected to a manual actuation means 3070, for example in the form of a cylindrical button overriding the lock 307, this means 3070 allowing the lock 307 to be unlocked to allow passage from the first relative rotational position to the second relative rotational position. Thus, the lock 307 allows the fingers 303 to be blocked in the first tube 28 edge 281 clamping position. The lock 307 includes for example a first lock portion 3071 capable of retracting into a hollow 3072 of the ring 305 or of an outer arm 3010 fixed to it, to block this ring 305 in the first clamping position. The manual actuation means 3070 is provided to raise the first portion 3071 of the lock and remove it from the hollow 3072 so as to unlock the lock 307. A preloading means can be provided on the first portion 3071 of the lock to load it toward the ring 305 or toward the arm 3010, so that this portion 3071 is automatically engaged in the hollow 3072 in the first clamping position.

According to one embodiment, the plurality of actuation zones 3051 comprises respectively a plurality of first portions 3052 of the inner surface 3053 of the ring 305. These portions 3052 of the inner surface 3053 of the ring 305 are separated from one another by a plurality of recesses 3054 of this inner surface 3053. These recesses 3054 are farther from the axis A than the first portions 3052 of the inner surface 3053 of the ring 305 and are used for the reception, respectively of the plurality of outer actuating members 3031 in the second relative rotational position, that is in the unclamping position.

According to one embodiment, each recess 3054 has a first slope, which begins in the first adjacent portion 3052 and which moves away from the axis A until a bottom 3055, to guide the outer actuating member 3031 between one and the other of a first position retracted in the guide 3030 in the first relative rotational position, that is the clamping position, and a second protruding position in the bottom 3055 of the recess 3054 in the second relative rotational position, that is in the second unclamping position. Thus, when the ring 305 is rotated in a first clamping direction of rotation S1 around the axis A with respect to the body 3060 or to the base 306, that is from the second position to the first position, each actuating member 3031 slides against the second portion 3056 of the inner surface 3053 delimiting the recess 3054, from the bottom 3055 to the first portion 3052, which constrains the actuating member 3031 and therefore the finger 303 fixed to it, to slide in the guide 3030 from the outside to the inside to approach the axis A and thus cause the finger 303 to extend beyond the inner side 3064 in the cavity 316. When the ring 305 is rotated with respect to the body 3060 or to the base 306 in an unclamping direction of rotation S2, the reverse of the first direction S1, around the axis A, each actuating member 3031 is made free to slide toward the outside in the guide 3030 against the second portion 3056 of the surface 3053 delimiting the recess 3054, to pass from the first portion 3052 to the bottom 3055 and cause the finger 303 to slide from the inside to the outside until this finger 303 no longer extends beyond the inner side 3064 and no longer protrudes into the cavity 316 in the second unclamping position.

According to one embodiment, each outer actuating member 3031 comprises a cam 3032 having a second slope turned toward the ring 305 and rising in the same direction as the first slope. Thus, the cam 3032 can slide along the first slope of the second portion 3056 delimiting the recess 3054. Of course, the first slope may not be identical to the second slope, as is shown in FIGS. 6 and 7.

According to one embodiment, each guide 3030 includes a biasing element 3033 for biasing the outer actuating member 3031 to move toward the ring 305, that is from the inside to the outside. This biasing element 3033 is therefore provided to constrain the finger 303 to move from the cavity 316 to the outside, in other words to retract the finger 303 into the body 3030. This biasing element 3033 can be formed from one or more spring(s). For example, the outer actuating member 3031 is fixed to its respective finger 303 through a stem 3034. The biasing element 3033 can be provided between an abutment part 3035 fixed to the body 3060 in the guide 3030 and the outer actuating member 3031, for example by including a compression spring between the abutment part 3035 and the member 3031. As a variant, the biasing element 3033 can be provided between an abutment part 3035 fixed to the body 3060 in the guide 3030 and the finger 303, for example by including a draw spring between the abutment part 3035 and the finger 303. Thus, the actuating member 3031 is pressed by the biasing element 3033 against the inner surface 3053 of the ring 305, namely against its first portion 3052 closer to the axis A in the first clamping position, against the second portion 3056 during passage from the first clamping position to the second unclamping position and against the bottom 3055 of the recess 3054 in the second unclamping position.

According to one embodiment, the first sealing member 310 includes a first dynamic seal 300, which adjoins the feedthrough 3061 and which is capable of being activated by inflation by injection of a fluid via an endpiece 302 of the base 306 to press a portion 311 of the first seal 300 against the column 27 in the feedthrough 3061. This dynamic seal 300 is for example annular in the feedthrough to surround the column 27 around the axis A. The endpiece 302 communicates through inner recesses 312 with the first seal 300, to allow a fluid to be sent into this seal 300 from the endpiece 302. The endpiece 302 is able to be connected to an outer duct for sending fluid. The injection of the fluid through the endpiece 302 from the outside duct fills the dynamic seal 300 and deforms it to cause a movement of its portion 311 in the centripetal direction, that is toward the column 27, so that the portion 311 of the seal 300 is supported against the column 27 so as to provide a sealing barrier around it.

According to one embodiment, the sealing device 30 includes movement transmission means 3036 to press the second sealing member 304 against the edge 281 of the tube 28, when the ring 305 and the base 306 pass from the second relative rotational position to the first relative rotational position, that is to clamp the edge 281 of the tube 28.

According to one embodiment, the second sealing member 304 includes a second seal 3040, which is turned in a first direction A1 of the axis A toward a first surface 282 of the edge 281 of the tube 28, this surface 282 being transverse to the axis A and in particular perpendicular to the axis A. The movement transmission means 3036 include a second support surface 3037, situated on each finger 303. The second support surface 3037 of each finger 303 is used to press against a second surface 284 of the edge 281, the surface 284 being for example parallel to the surface 3037. This second surface 284 is distant from the first surface 282 along the axis A. This second support surface 3037 rises when approaching the first surface 282 while moving away from the axis A. This second support surface 3037 rises in a second direction A2 of the axis A (the reverse of the first direction A1) running from the inside to the outside, to press the second seal 304 toward the first surface 282, when the finger 303 slides in the cavity 316 from the outside to the inside until the first edge 281 clamping position. The second support surface 3037 rises for example in the same direction as the surface 284 which is for example a rear surface 284 of the rim of the edge 281, axially distant from the first surface 282. Thus, the movement from the outside to the inside of the finger 303 to arrive in the first clamping position causes, through the support surface 3037, the movement of the second seal 3040 in the first direction A1 toward the first surface 282 of the edge 281. In addition, the edge 281 includes a lateral outer surface 283, which is for example parallel to the axis A and which is connected, on the one hand, to the surface 282 and on the other hand to the surface 284. The finger 303 includes for example another surface 3037*b* farther from the axis A than its surface 3037 and parallel to the axis A, for support against the lateral outer surface 283.

According to one embodiment, at least three fingers 303 are provided as fingers 303, hence at least two 303*a*, 303*b* are positioned in a first 180° angular sector SEC1 around the axis A, and at least one 303*c* is positioned in a second 180° angular sector SEC2 complementary to the first sector SEC1 in the first tube 28 edge 281 clamping position, as shown in FIG. 6. Three fingers 303 can for example be provided. Of course, four fingers 303 or a greater number of fingers 303 can be provided.

According to one embodiment, fingers 303 are distributed in an equiangular manner around the axis A in the first clamping position. Thus, in the case of three fingers 303, these can be regularly distributed at 120 degrees from one another around the axis A. In the case of four fingers 303, these can be distributed at 90 degrees to one another around the axis A.

The sealing device 30 can be used with or without EIS (lower inner equipment) that is with or without a column 27. In one embodiment in FIG. 8, in the case of use without EIS, that is without the column 27, but where the sealing device 30 must be clamped around the edge 281 of the tube 28, one or more plugs 3068 can be installed and fixed to the base 306 for plugging the feedthrough 3061, as shown in FIG. 8. The plug 3068 is fixed to the upper portion 3063, for example by removable fixing means 3069, which can be of the bolting type or another.

The invention also relates to a method for mounting the sealing device 30 described above against an end edge 281 of a tube 28 and against a column 27 which must pass through an opening 285 of the tube 28 along axis A, delimited by this edge 281, the sealing device 30 including the movement transmission means 3036 described above.

According to this method, during a first step, the ring 305 and the base 306 are rotated with respect to one another around the axis A from the second relative rotational position to the first relative rotational position (i.e. in the first clamping direction S1), for clamping the base 306 against the edge 281 of the tube 28 and for pressing the second sealing member 304 against the edge 281 of the tube 28.

Then, during a second step, the first sealing member 310 is activated to press it against the column 27 in the feedthrough 3061.

The sealing device 30 according to the invention and the method for mounting it according to the invention can be used to be fixed around and accomplish sealing on the edge 281 of a tube 28 fixed to the cover 3 of a vessel 1 of a nuclear reactor, as shown in FIGS. 1 and 2 and as described above and on the thermocouple column 27 of this vessel 1.

In the preceding, the edge 281 to which the sealing device must be fixed according to the invention can be a flange 40, itself welded to the tube 28, itself welded to the cover 3, the flange 40 and the tube 28 having the column 27 passing through them as shown in FIG. 9, the flange 40 including the portions 281, 282, 283, 284 and 285 described above. The tube 28 can be an adapter tube 28, adapted to allow the sealed exit of a column 27 within which are located movable probes 26 having the function of thermocouples.

Thus, the vacuumization procedure of this vessel 1 of a nuclear reactor using the sealing device 30 according to the invention can be the following.

At the time when the dedicated sealing systems are withdrawn, when the cover 3 is still on the vessel 1 after the stop of the nuclear plant unit, the sealing device 30 is placed and locked to the edge 281 of the tube 28 in the first clamping position, by rotation of the base 306 and the ring 306 in the first direction S1 of one with respect to the other.

Then, the cover 3 is removed with respect to the vessel 1 and this cover 3 is set aside. In another embodiment, these first two steps can be congruent, the installation and the locking being able to be accomplished once the cover is set aside.

The mouthpiece of a pression fluid duct is then disposed on the endpiece 302 of the device 30.

Then, the cover 3 is put back on the seal plane 10 of the vessel 1 to begin the vacuumization operation, the device 30 being equipped with its duct for the injection of fluid under pressure.

Then, from a distant console, a vacuumization action of the duct is commanded to inflate the dynamic seal 300 and insure sealing around the column 27.

Afterward, a rest period is provided to observe any deviation of pressure, which would be a sign of a leak or a malfunction of the dynamic seal 300.

Then, the MSV and filling of the primary circuit procedure as described above is implemented.

At the end of this MSV and filling of the primary circuit procedure, the vacuum of the primary circuit being broken and considering the return to atmospheric pressure, the dynamic seal 300 is remotely operated to be unclamped by releasing the compression fluid.

Then, in order to guarantee total release of the column 27, a slight depression is created in the dynamic seal 300.

Then, the cover 3 comprising the device 30 installed on it is set aside, and the loading of the core can begin.

The injection duct is then removed from the endpiece 302.

The sealing device 30 is then unlocked with respect to the edge 281 of the tube 28 in the second unclamping position, by rotation of the base 306 and of the ring 306 in the second direction S2 with respect to one another. The device 30 is then removed with respect to the tube 28 and the column 27.

The cover, without the device 30, can then be remounted on the seal plane 10 of the vessel 1.

The present invention contributes to improving the current situation, in particular it reduces to less than a minute the exposure time to ionizing radiation. It allows time to be saved over the critical path by operating in hidden time. It makes environmental systems lighter by allowing scaffolding customarily provided in the prior art at the bottom of the pool surrounding the vessel 1 to be dispensed with, and as a result it reduces costs for the operator.

The main application of the present invention is the achievement of sealing around the thermocouple columns 27 passing through the cover 3 of the vessel 1 for the purpose of achieving a vacuumization of the primary circuit following the filling of the loops, in the context described above with reference to FIGS. 1 and 2.

A secondary use of the invention consists of using the sealing device 30 as a protective sealing surfaces. Indeed, these sealing surfaces are very sensitive and their possible repairs prove to be very delicate.

The invention allows a reduction in the exposure time of personnel to ionizing radiation, with particularly a reduction in the overall time spent in the bottom of the pool (scaffolding assemblers, vessel work operators) and a gain of approximately 3.5 mSv/vacuumization (estimated values).

The invention allows a reduction of the intervention time of personnel, with in particular improved reliability and safety of sealing around the columns 27, installation of the tooling in hidden time, a gain of approximately 3 hours and 45 minutes/vacuumization.

The invention allows an improvement in safety, with in particular elimination of the need for access to the cover 3 by scaffolding at the bottom of the pool, which would generate a fall risk, elimination of the mounting of scaffoldings (manual handling).

The invention claimed is:

1. A sealing device—intended to be fixed against an end edge of a tube, and against a column extending along an axis and through an opening in the tube and delimited by the end edge, the device comprising:

a base having a feedthrough for an axial passage of the column, a first sealing member capable of being activated to be pressed against the column in the feedthrough, a body surrounding around the axis a cavity for receiving the end edge of the tube, a second sealing member intended to be pressed against the end edge of the tube in the cavity, the feedthrough communicating axially with the cavity, wherein the body includes a plurality of guides, which are distributed around the cavity, the plurality of guides extending between an inner side of the body which opens into the cavity and an outer side of the body which opens against a concentric clamping ring rotatably mounted around the axis with respect to the base, wherein a plurality of inner fingers integral with a plurality of outer actuating members are guided respectively in the plurality of guides around the cavity, the concentric clamping ring including a plurality of actuation zones which are mutually distant and which are capable of being respectively positioned against the plurality of outer actuating members to cause the inner fingers to slide and protrude in the cavity for clamping the inner fingers against the end edge of the tube when the ring and the base are, with respect to one another, in a first relative rotational position, called a first tube edge clamping position, wherein the ring and the base are capable of passing, by rotation with respect to one another around the axis, between the first relative rotational position and a second relative rotational position, called a tube edge unclamping position, wherein the plurality of actuation zones is at a distance from the plurality of outer actuating members to allow the inner fingers to be retracted into the body.

2. The sealing device according to claim 1, wherein the plurality of guides extends radially with respect to the axis for the radial guidance of the inner fingers with respect to the axis.

3. The sealing device according to claim 1, wherein the base and/or the body is integral with at least a first handle, and the concentric clamping ring is integral with at least a second handle.

4. The sealing device according to claim 1, wherein the base includes a lock for blocking the concentric clamping ring and the body in the first relative rotational position, the lock being connected to a manual actuation means allowing the lock to be unlocked to allow passage from the first relative rotational position to the second relative rotational position.

5. The sealing device according to claim 1, wherein the plurality of actuation zones comprises respectively a plurality of portions of the inner surface of the ring, separated from one another around the axis by a plurality of recesses of this inner surface, which are farther from the axis than the plurality of portions and which are used for the reception, respectively, of the plurality of outer actuating members in the second relative rotational position.

6. The sealing device according to claim 5, wherein each recess of the plurality of recesses has a first slope, starting from the portion of the plurality of portions of the inner surface of the concentric clamping ring and extending away from the axis until a bottom of the recess, for guiding the outer actuating member between one and the other of a first position retracted into the guide in the first relative rotational position and a second position protruding in the bottom in the second relative rotational position.

7. The sealing device according to claim 6, wherein each outer actuating member comprises a cam having a second slope turned toward the concentric clamping ring and rising in the same direction as the first slope.

8. The sealing device according to claim 1, wherein each guide includes a biasing element for biasing the outer actuating member to move toward the concentric clamping ring.

9. The sealing device according to claim 1, wherein the first sealing member includes a first dynamic seal, adjoining the feedthrough and capable of being activated by inflation by injection of a fluid via an endpiece of the base to press a portion of the first seal against the column in the feedthrough.

10. The sealing device according to claim 1, further comprising movement transmission means for pressing the second sealing member against the edge of the tube, when the concentric clamping ring and the base pass from the second relative rotational position to the first relative rotational position.

11. The sealing device according to claim 10, wherein the second sealing member includes a second seal turned in a first direction of the axis toward a first surface of the edge of the tube, the movement transmission means include, on each inner finger of the plurality of inner fingers, a second support surface for bearing against a second surface of the end edge, which is axially distant from the first surface, this second support surface rising in a second direction opposite the first direction, to press the second seal toward the first surface, when each inner finger slides in the cavity from the outside to the inside until the first tube edge clamping position.

12. The sealing device according to claim 1, wherein at least three fingers are provided, of which at least two are positioned in a first 180° angular sector around the axis and of which at least one other is positioned in a second 180° angular sector complementary to the first sector in the first tube edge clamping position.

13. The sealing device according to claim 1, further comprising removable fixing means of at least one plug to plug the feedthrough in the absence of a column in the latter.

14. A method for mounting the sealing device according to claim 1 comprising:

fixing the sealing device against the end edge of the tube, and against the column which must pass through an opening in the tube delimited by the end edge along the axis, the sealing device including movement transmission means for pressing the second sealing member against the edge of the tube, when the concentric clamping ring and the base pass from the second relative rotational position to the first relative rotational position for clamping against the edge of the tube, rotating the ring and the base with respect to one another around the axis from the second relative rotational position to the first relative rotational position to clamping the base against the edge of the tube and press the second sealing member against the edge of the tube, activating the first sealing member to be pressed against the column in the feedthrough.

* * * * *